United States Patent [19]

Gardner et al.

[11] 3,857,923

[45] Dec. 31, 1974

[54] MULLITE PACKAGE FOR INTEGRATED CIRCUIT DEVICES

[75] Inventors: Richard A. Gardner, Wappingers Falls, N.Y.; David L. Wilcox, San Jose, Calif.

[73] Assignee: International Business Machines Corporation, Armonk, N.Y.

[22] Filed: June 20, 1972

[21] Appl. No.: 264,668

[52] U.S. Cl. .................... 423/327, 106/65, 106/69, 106/288 B, 252/448, 252/445 B, 264/56, 264/61, 264/63, 423/115, 423/337, 423/593, 423/600, 423/625

[51] Int. Cl. .................................... C01b 33/36

[58] Field of Search ........... 423/327, 328, 593, 594, 423/600, 111, 115, 118, 337, 625; 106/65, 67, 288, 69, 299; 264/63, 66, 56; 252/448

[56] References Cited

UNITED STATES PATENTS

| | | | |
|---|---|---|---|
| 2,635,946 | 4/1963 | Weber et al. | 423/337 |
| 2,641,044 | 6/1953 | Bearer | 264/63 |
| 3,002,808 | 10/1961 | LaMont | 423/625 |
| 3,207,573 | 9/1965 | Borchardt | 423/593 |
| 3,336,108 | 8/1967 | Leatham | 423/327 |
| 3,631,131 | 12/1971 | Kopko | 264/63 |
| 3,730,748 | 5/1973 | Lailach et al. | 264/66 |

*Primary Examiner*—Oscar R. Vertiz
*Assistant Examiner*—Gary P. Straub
*Attorney, Agent, or Firm*—David M. Bunnell

[57] ABSTRACT

A process for forming a substantially stoichiometric high density, high purity mullite compound ($3Al_2O_3 \cdot 2SiO_2$) capable of being fired in a single step.

8 Claims, 1 Drawing Figure

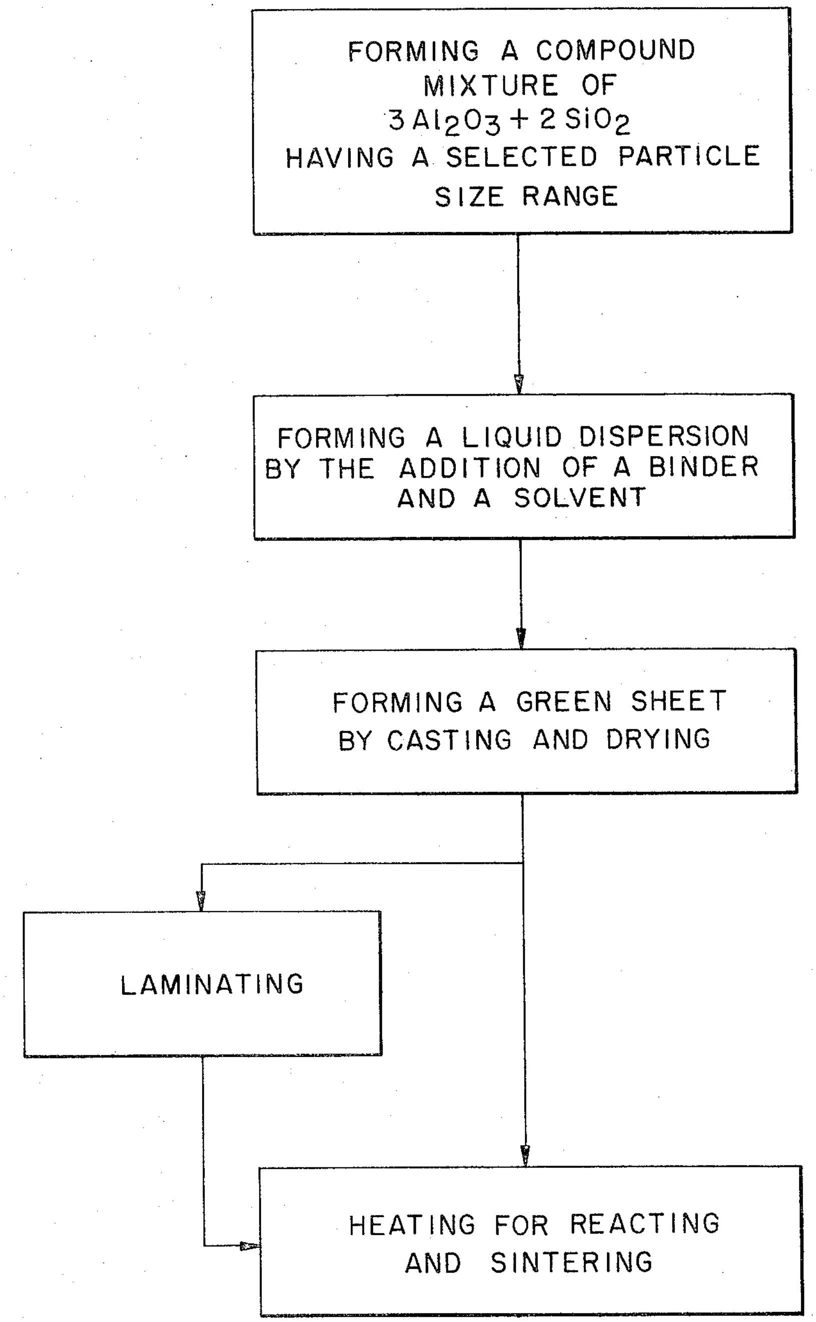
FORMING A COMPOUND MIXTURE OF $3 Al_2O_3 + 2 SiO_2$ HAVING A SELECTED PARTICLE SIZE RANGE
FORMING A LIQUID DISPERSION BY THE ADDITION OF A BINDER AND A SOLVENT
FORMING A GREEN SHEET BY CASTING AND DRYING
LAMINATING
HEATING FOR REACTING AND SINTERING

MULLITE PACKAGE FOR INTEGRATED CIRCUIT DEVICES

BACKGROUND OF THE INVENTION

Mullite has long been known in the ceramic and refractory industries. Mullite is one of the most stable compounds in the $Al_2O_3 \cdot SiO_2$ system. Consequently, it occurs as a main constituent in a large number of ceramic products which are fabricated from alumino-silicate materials. Considerable amounts of mullite are used to produce refractory bodies designed to withstand high temperatures. Its relatively low thermal coefficient of expansion makes such refractories more resistant to thermal stresses in contrast to similar bodies prepared from aluminum oxide materials.

Mullite possesses a dielectric constant of approximately 5–6, and therefore, presents a very attractive electrical characteristic as integrated circuit technology continues advancing to higher speed circuit devices. Moreover, mullite's low thermal coefficient of expansion offers an excellent match to large silicon integrated circuit chips or glasses which may be placed on substrates. Although mullite has been mentioned for use as an electronic substrate for integrated circuit devices, high grade and density, substrates are not known to exist.

SUMMARY OF THE INVENTION

It is therefore an object of the present invention to provide a method of fabricating a substantially stoichiometric high density, high purity mullite compound ($3Al_2O_3 \cdot 2SiO_2$) in a single firing step.

In accordance with the aforementioned object, the present invention provides a method comprising the steps of preparing a mixture of alumina and silica by flame pyrolysis so as to produce an optimum particle size to allow complete sintering and reacting in a single firing or heating step.

BRIEF DESCRIPTION OF THE DRAWING

The sole FIGURE illustrates the basic method steps of the present invention.

BRIEF DESCRIPTION OF THE PREFERRED EMBODIMENTS

Step 1

During mixture preparation, a compound mixture of $3Al_2O_3 + 2SiO_2$ is formed having the desired particle size, namely .03 – .1 microns. This mixture is formed by flame pyrolysis of a solution comprising $6AlCl_3$ + $2SiCl_4$. During this reaction, the hydrogen flame reacts with chlorine compounds and goes off as HCL gas, leaving the alumina and silica to react with oxygen to form $3Al_2O_3 + 2SiO_2$. Furthermore, the flame pyrolysis also grows the particle size to the optimum .03 – .1 micron range. It is found that particle sizes much lower than .03 micron make the powder extremely difficult to handle. Conversely, where particle sizes are much larger than .1 micron, it is difficult to obtain complete sintering in a single firing step during later stages of the process.

Step 2

In this step, a liquid dispersion is formed from the mixture of $3Al_2O_3 + 2SiO_2$ by the addition of a suitable binder and solvent. By way of example, an adequate binder is formed by combining a polyvinylbutyral resin or polymer with a plasticizer, such as dioctylphthalate or dibutylphthalate. The plasticizer component in the binder insures that the subsequently formed green sheet material attains the desired state of pliability. Other examples of suitable polymers are polyvinylformal, polyvinylchloride and polyvinylacetate.

Next, after the binder is mixed with the mixture of compounds, a suitable solvent is added. The purpose of the solvent is to dissolve the plasticizer and resin so as to permit the binder to coat the ceramic particles. Also, the solvent provides suitable viscocity for a subsequent casting step.

Step 3

During this step, a green sheet material of mullite is formed by casting and drying. In the preferred embodiment, doctor blading is selected as the method of casting or spreading the liquid dispersion to a suitable thickness. During doctor blading, a plastic carrier is pulled under a stationery knife so as to spread the liquid dispersion on the plastic carrier to the desired thickness.

The doctor bladed liquid dispersion is then dried under ambient conditions in order to evaporate or remove the solvents.

Step 4

Next, the dried green sheet material is heated or fired in order to react and sinter the green sheet material. Prior to the heating step, the green sheet materials may be laminated in order to form a resultant product having greater thickness than an individual green sheet.

Firing or heating, for example in an oven, is primarily employed to eliminate the binder, generate an exothermic reaction, and sinter the particles in a single firing step. The green sheet or laminated material is placed in the oven and the temperature is raised to a maximum value in the range of 1,500°–1,600° C. At about 300° C, the binder begins to be driven off and is eliminated almost completely at approximately 1,000° C. At about 980° C, an exothermic reaction takes place almost instantaneously during which time the mixture of compounds comprising $3Al_2O_3$ + $2SiO_2$ goes to $3Al_2O_3 \cdot 2SiO_2$.

Sintering consolidates the compounds of $3Al_2O_3 \cdot 2SiO_2$ so as to remove voids. Sintering begins to occur in the temperature range of 1,200° C, and optimum high density, high purity mullite substrate is produced by continuing the sintering operation until the temperature range of between 1,500° and 1,600° C is attained. Temperature higher than 1,600° C may be employed, but they are not necessary for optimum sintering. Thereafter, the substrate is removed from the oven and cooled under ambient conditions. By way of example, the sintering to cooling cycle consumes approximately twelve hours.

The described process resulted in the formation of a high grade mullite substrate having a measured density greater than 99% of the theoretical density (3.15 $g/cm^3$) and a purity of approximately 99.95%.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of fabricating a substantially stoichiometric high density and high purity mullite compound comprising the steps of:

a. forming a particulate mixture of $3Al_2O_3 + 2SiO_2$ by the hydrogen flame pyrolysis of a solution of $6AlCl_3$ and $2SiCl_4$;

b. forming a liquid dispersion of said mixture with a binder and a solvent such that said binder coats the particles of said mixture;

c. removing said solvent from said mixture; and d. heating said mixture to a temperature above about 900° C so as to remove said binder, react said $Al_2O_3$ and $SiO_2$ to form a $3Al_2O_3 \cdot 2SiO_2$ mullite compound, and sinter said compound to remove voids.

2. The method of claim 1 wherein the particles in step *a* have a particle size of from .03 to .1 micron.

3. The method of claim 1 wherein said binder is a polymer.

4. The method of claim 3 wherein a plasticizer is mixed with said polymer.

5. The method of claim 4 wherein said polymer is polyvinylbutyral and said plasticizer is dioctylphthalate.

6. The method of claim 4 wherein in step *c* said liquid dispersion is cast and dried in the form of sheet material such that said method forms a sintered mullite body suitable for use as an integrated circuit substrate.

7. The method of claim 6 wherein said sheet material is heated in step *d* to a maximum temperature in the range of 1,500° – 1,600° C.

8. The method of claim 7 wherein a plurality of said sheet material is laminated prior to being heated in step *d*.

* * * * *